United States Patent
Dill et al.

(10) Patent No.: US 10,356,650 B2
(45) Date of Patent: Jul. 16, 2019

(54) METHOD, SYSTEM, DEVICE, AND PROGRAM FOR REMOTELY COMMUNICATING WITH AND CONTROLLING LAUNDRY UNITS

(71) Applicant: ALLIANCE LAUNDRY SYSTEMS, LLC, Ripon, WI (US)

(72) Inventors: Adam Dill, Ripon, WI (US); Scott Chiavetta, Ripon, WI (US); Ryan Moore, Neenah, WI (US); Bill Coffman, Neenah, WI (US); Richard Guernsey, Neenah, WI (US)

(73) Assignee: Alliance Laundry Systems LLC, Ripon, WI (US)

( * ) Notice: Subject to any disclaimer, the term of this patent is extended or adjusted under 35 U.S.C. 154(b) by 0 days.

(21) Appl. No.: 15/838,086

(22) Filed: Dec. 11, 2017

(65) Prior Publication Data

US 2018/0338258 A1 Nov. 22, 2018

Related U.S. Application Data

(60) Provisional application No. 62/508,945, filed on May 19, 2017.

(51) Int. Cl.
*H04Q 9/00* (2006.01)
*H04W 4/80* (2018.01)
(Continued)

(52) U.S. Cl.
CPC ........ *H04W 28/0215* (2013.01); *D06F 31/00* (2013.01); *D06F 33/02* (2013.01);
(Continued)

(58) Field of Classification Search
CPC .... G08C 17/00; G08C 2201/33; G08C 23/04; G08C 17/02; G08C 19/28; G08C 2201/50; G08C 25/02; G08C 2201/51
(Continued)

(56) References Cited

U.S. PATENT DOCUMENTS 9,495,093 B2 * 11/2016 Kim .................... G06F 3/165
9,578,511 B2 * 2/2017 Kashef ................. H04L 63/08
(Continued)

FOREIGN PATENT DOCUMENTS

WO 2017079847 A1 5/2017
WO WO 2017079849 A1 * 5/2017 .......... A61B 5/0071

OTHER PUBLICATIONS

International Search Report and Written Opinion for PCT/US2018/033387 dated Aug. 3, 2018, 7 pages.

*Primary Examiner* — Mark S Blouin
(74) *Attorney, Agent, or Firm* — Husch Blackwell LLP

(57) ABSTRACT

A system is provided for remotely communicating with one or more cleaning units, each including a control unit for operating the cleaning unit, and a first low data rate device coupled to the control unit. A gateway unit nearby each of the cleaning units includes a Wi-Fi protocol device and a second low data rate device coupled to the Wi-Fi protocol device. An internet connected device is wirelessly coupled to the WiFi protocol device, and the first low data rate device is wirelessly coupled to the second low data rate device. A data transfer rate of the first and second low data rate devices is substantially lower than a data transfer rate of the WiFi protocol device.

20 Claims, 14 Drawing Sheets

(51) Int. Cl.
*D06F 31/00* (2006.01)
*D06F 33/02* (2006.01)
*D06F 39/00* (2006.01)
*G06Q 20/32* (2012.01)
*G06Q 50/10* (2012.01)
*G08C 17/02* (2006.01)
*H04W 28/02* (2009.01)
*H04W 88/16* (2009.01)

(52) U.S. Cl.
CPC ......... *D06F 39/005* (2013.01); *G06Q 20/325* (2013.01); *G08C 17/02* (2013.01); *H04Q 9/00* (2013.01); *D06F 2210/00* (2013.01); *D06F 2212/02* (2013.01); *D06F 2214/00* (2013.01); *D06F 2216/00* (2013.01); *G06Q 50/10* (2013.01); *G08C 2201/51* (2013.01); *H04Q 2213/1313* (2013.01); *H04W 4/80* (2018.02); *H04W 88/16* (2013.01)

(58) Field of Classification Search
USPC .......................................................... 340/4.35
See application file for complete search history.

(56) References Cited

U.S. PATENT DOCUMENTS

| | | | | |
|---|---|---|---|---|
| 9,590,817 | B2* | 3/2017 | Kim | H04L 63/062 |
| 9,667,804 | B1* | 5/2017 | Hall | H04M 11/007 |
| 9,814,084 | B2* | 11/2017 | Sidhu | H04W 76/10 |
| 2005/0108326 | A1 | 5/2005 | Tuttle | |
| 2016/0323977 | A1* | 11/2016 | Sun | H04L 12/2816 |

\* cited by examiner

FIG. 5A

NOTE: "My Machines" will change to whatever location or branch is selected in the tree view.

*General Reports*
Includes reports related to machine listing, security, location, presets and maintenance as well as task, contact, employee, wash/dry/fold, network controller, machine type, service type, product type and action reason.
    Machine Listing for "My Machines"
    Machine Setup for "My Machines"
    Machine Security Data for "My Machines"
    Machine Fill Time for "My Machines"
    Machine Drain Time for "My Machines"
    Machine Last Programmed for "My Machines"
    Location Listings for "My Machines"
    Maintenance Task Listing
    Preset Listing
    Task Listing
    Contact Listing
    Employee Listing
    Wash/Dry/Fold Listing
    CardMate Hotlist Listing
    CardMate Card Listing
    PDA Listing
    Network Controller Listing for "My Machines"
    Machine Type Listing
    Service Type Listing
    Product Type Listing
    Action Reason Listing

*Network Reports*
Contains reports related to the cycle, operation, break-in, error and power fail history of the item highlighted in the tree view.
    Network Cycle History for "My Machines"
    Network Operation History for "My Machines"
    Network Break-in History for "My Machines"
    Network Error History for "My Machines"
    Network Powerfail History for "My Machines"

*Processed Reports*
Provides reports listing the cycle, vend, audit, security and diagnostic information processed on the item highlighted in the tree view.
    Processed Listing for "My Machines"
    Processed Detailed Cycle for "My Machines"
    Processed Turns for "My Machines"
    Processed Special Vend Cycle for "My Machines"

FIG. 5B

Processed Smart Card Audit for "My Machines"
Processed Detailed Vend for "My Machines"
Processed Detailed Coin Audit for "My Machines"
Processed Detailed Pulse Audit for "My Machines"
Processed Detailed Card Audit for "My Machines"
Processed Detailed Remote Audit for "My Machines"
Processed Additional Vend for "My Machines"
Processed Variance Vend for "My Machines"
Processed Security for "My Machines"
Processed Lucky Cycle for "My Machines"
Processed Common Diagnostic for "My Machines"

*Audit Reports*
Includes reports detailing the operation, productivity, vending and security of the item highlighted
in the tree view.
   Audit Operation for "My Machines"
   Audit Productivity for "My Machines"
   Audit Common Diagnostic for "My Machines"
   Audit Error Diagnostic for "My Machines"
   Audit Total Vending for "My Machines"
   Audit Detailed Vending for "My Machines"
   Audit Additional Vending for "My Machines"
   Audit Additional Cycle for "My Machines"
   Audit Free Vending for "My Machines"
   Audit Variance Vending for "My Machines"
   Audit Average Vend for "My Machines"
   Audit Turns for "My Machines"
   Audit Special Vend for "My Machines"
   Audit Security for "My Machines"
   Audit Lucky Cycle for "My Machines"
   Audit Cycle Usage for "My Machines"

*Lifetime Reports*
Offers reports summarizing the operation and error diagnostics over the lifetime of the item highlighted in the tree view.
   Lifetime Operation for "My Machines"
   Lifetime Error Diagnostic for "My Machines"

*Pricing Reports*
Displays the pricing information for every cycle on every machine.
   Pricing Detailed for "My Machines"
   Pricing Overview for "My Machines"
   Pricing Change for "My Machines"

FIG. 5C

*Water Usage Reports*
Lists the approximate amount of water each machine uses per cycle.
  Water Usage Detailed for "My Machines"
  Water Usage Overview for "My Machines"

*Snapshot Reports*
Displays snapshot report on selected machines.
  Store and Revenue for "My Machines"
  Attendant Audit for "My Machines"
  Coin Vault for "My Machines"

Config Pricing

FIG. 6B

○○○ / ⓠ SQ Business Suite ×

← → C | ⓞ localhost:4200/machines/programs?scrub=facility&sid=1&stype=facility edprats ⓠ Summary  Employees  Facilities  Products  Machines  Customers Search List  Programs  Pricing  Cycles  Water Guardian  Machine Configuration

[Express Laundry Center]
facility

Overview (40) ▼

Configuration
Edit the pricing and settings of your machines

| Regular Wash | Medium Modifier |
|---|---|
| Type<br>Nine-Level Vend | Additional Price<br>[25]<br>☑ Mod 1 Active State<br>☑ Mod 2 Active State<br>☑ Additional Wash Time 1<br>[2]<br>☐ Additional Wash Time 2<br>[2]<br>☑ Warm Final Rinse |

|  | Normal | Perm Press | Delicate |
|---|---|---|---|
| Hot | [200] | [200] | [200] |
| Warm | [200] | [200] | [200] |
| Cold | [200] | [200] | [200] |

Default Cycle
Permanent press hot
Default Cycle modifier
Light

Default Cycle
Permanent press hot
Default Cycle modifier
Light

Heavy Modifier

☑ Enable Coin Drops 1
[25]

☑ Enable Coin Drops 2
[25]

Additional Price
[25]
☑ Mod 1 Active State
☑ Mod 2 Active State
☑ Additional Wash Time 1
[2]
☐ Additional Wash Time 2
[2]
☑ Warm Final Rinse Default Cycle
Permanent press hot
Default Cycle modifier
Light GENERAL  [Edit]

Lazybones Laundry & Storage
[CONNECTED]

Facility Number
R001

Phone
+1 (310) 923 - 5555

Hours of Operations
9:00am - 8:00pm PST

ON DUTY

Manager
Henry Doogle

Employee
Annabelle Lee

Technician
Jeff Mangum

Config Machine

```
○○○ / ⊕ SQ Business Suite × \                                                          edprats
← → C  ⊕ localhost:4200/machines/water-configuration?scrub=facility&sid=1&stype=facility  ☆  ⊙ ▣ ⊕ ▩ ⊡ ⋮
```

| List  Summary Employees Facilities Products Machines Customers | Search | [Express Laundry Center]<br>facility |
|---|---|---|
| Programs Pricing Cycles Water Guardian Machine Configuration | | Overview (40) ▾   Edit |

Machine Configuration
Edit your general machine settings setting

| | | | GENERAL |
|---|---|---|---|
| ☑ Daylight Savings time | Fill Error Message<br>Disabled | | Lazybones Laundry & Storage<br>:CONNECTED: |
| ☐ Enable Vend Display Override | Drain Error Message<br>5 min | | Facility Number<br>R001 |
| ☐ Display Actual Temperature Indicator | No Water Flow Error Message<br>5 min | | Phone<br>+1 (310) 923 - 5555 |
| ☑ Enable IR Access | HeatPoter Error Message<br>Disabled | | Hours of Operations<br>9:00am - 8:00pm PST |
| ☐ Production Test Cycle | Slow to HEadPot Alarm Time<br>Disabled | | ON DUTY |
| ☑ Enable Card Reader Control Front End Display | | | Manager<br>Henry Doogle |
| ☐ Enable Error Clearing | | Cancel  Save | Employee<br>Annabelle Lee |
| ☑ Enable Cycle Pause and Resume | | | Technician<br>Jeff Mangum |

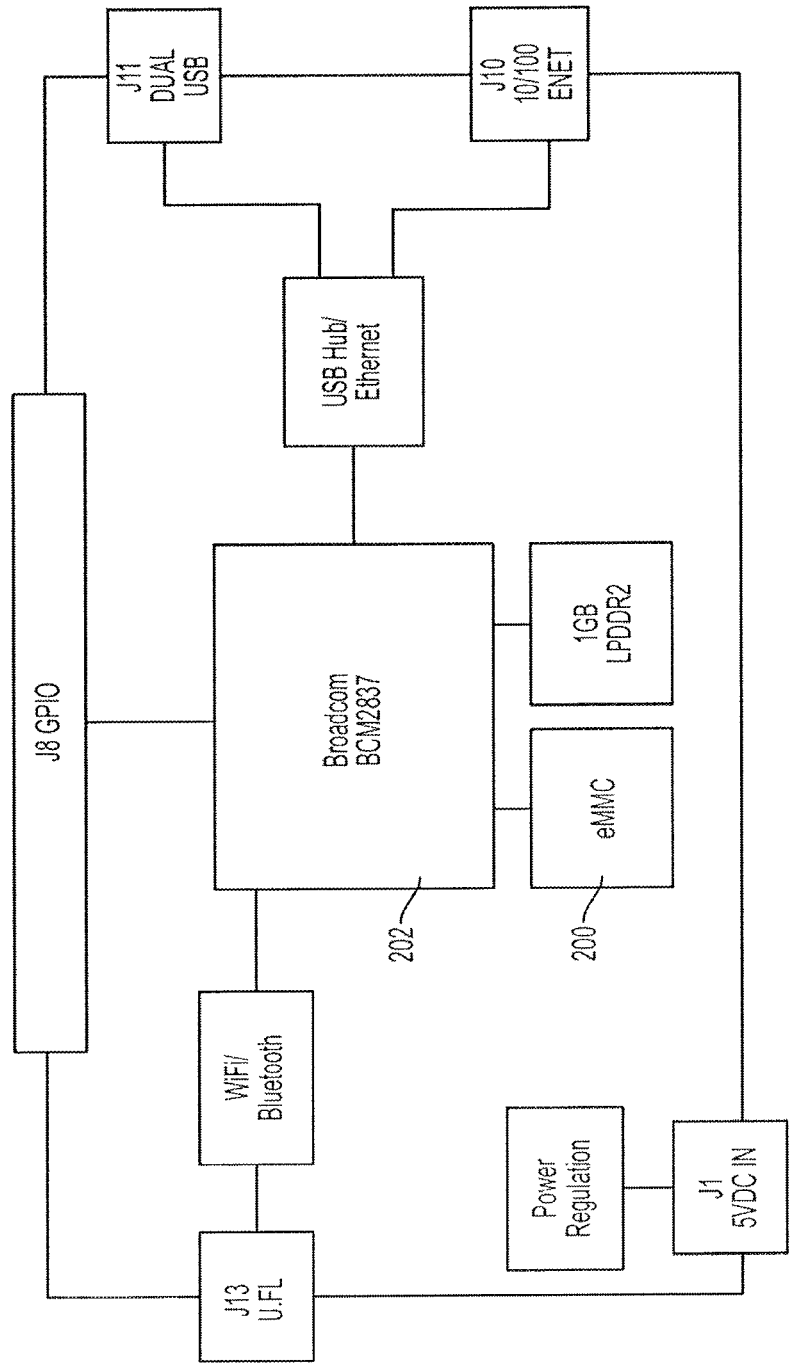

METHOD, SYSTEM, DEVICE, AND PROGRAM FOR REMOTELY COMMUNICATING WITH AND CONTROLLING LAUNDRY UNITS

CROSS-REFERENCE TO RELATED APPLICATION

The present nonprovisional application claims the benefit of U.S. Provisional Application No. 62/508,945 filed on May 19, 2017 and incorporates the same by reference.

BACKGROUND OF THE INVENTION

Field of the Invention

The present invention generally relates to a method, system, device, apparatus, and program for remotely communicating with laundry units, and more particularly to a method, system, device, apparatus, and program for enabling users to remotely communicate with and control laundry units to configure the units, to receive reports from the units, and to submit payments to the units.

Related Art

Conventional systems are limited in their ability to provide vended laundry payments to users. Historically, third party add-on systems have been used to provide such vended laundry payment capability. In conventional systems, reporting and configuration is available directly through a TCP (Transmission Control Protocol) connection from a PC (personal computer) through an 802.15.4 gateway. Currently these cannot be done through a website, and no device ties all functionality together in one device. An improved approach is therefore needed.

SUMMARY OF THE INVENTION

The foregoing and other problems are overcome by a method for enabling users and/or administrators to remotely communicate with laundry units to configure the units (e.g., by programming a wash or dry cycle), to receive reports from the units (e.g., reports related to the progress or completion of a wash or dry cycle), and to submit payments to the units for such wash or dry cycles. The present invention also provides a system, device, apparatus, and program that operate in accordance with the method.

In one example aspect the present invention provides a device that operates as a laundry room "Gateway." The Gateway comprises (1) a standard Raspberry Pi; and (2) a daughterboard including (a) a Wi-Fi chipset and (b) a chipset employing the IEEE 802.15.4 protocol. The Gateway wirelessly and directly connects laundry equipment using the IEEE 802.15.4 protocol to provide internet-based machine reporting and machine configuration while also enabling users to pay for vended laundry from a mobile device or phone. (See FIG. 4.)

By virtue of the features of the present invention, users can obtain reporting from and configure laundry equipment from any internet-connected device, including a mobile device such as a smartphone, iPhone, iPad, Android, Blackberry, Galaxy, tablet, notebook, or others. Users can also pay for vended laundry from such a mobile device. The gateway device of the present invention allows laundry equipment to communicate wirelessly with servers on the internet.

As noted above, historically, third party add-on systems have been used to provide vended laundry payments. Reporting and configuration could not be done through a website. No device tied all functionality together in one device.

The present invention overcomes these drawbacks and its solution packages everything into a single device. No other current laundry system provides a device which can communicate to laundry equipment over the 802.15.4 protocol, translate the data, and send the data to the internet to make it available in real-time while also allowing payments and configuration of the equipment.

In one example aspect of the invention translating the data involves gathering the data into a data stream. The data is then decoded from the machine byte arrays into human readable form and sent to the cloud. This translation is done by a piece of software that recognizes the machine type and size based on the data in the byte array and then pulls the relevant data out of the gathered array. The final form is JavaScript Object Notation (JSON) which is then sent to the cloud. Of course, this example is not meant to be limiting, and various other suitable techniques could be used.

In a first embodiment disclosed herein, a system for remotely communicating with one or more cleaning units comprises one or more cleaning units, each cleaning unit comprising a control unit coupled to the cleaning unit for operating the cleaning unit, and a first low data rate device coupled to the control unit, a gateway unit comprising a Wi-Fi protocol device, and a second low data rate device coupled to the Wi-Fi protocol device, wherein the gateway unit is nearby each of the cleaning units, and an internet connected device wirelessly coupled to the WiFi protocol device, wherein the first low data rate device is wirelessly coupled to the second low data rate device, wherein a data transfer rate of the first and second low data rate devices is substantially lower than a data transfer rate of the WiFi protocol device, and wherein the gateway unit enables the internet connected device to communicate wirelessly with each of the cleaning units thereby enabling the internet connected device to wirelessly configure or control each of the cleaning units.

In a another embodiment disclosed herein, a method for remotely communicating with one or more cleaning units comprises using one or more cleaning units, each cleaning unit comprising a control unit coupled to the cleaning unit for operating the cleaning unit, and a first low data rate device coupled to the control unit, providing a gateway unit comprising a Wi-Fi protocol device, and a second low data rate device coupled to the Wi-Fi protocol device, wherein the gateway unit is nearby each of the cleaning units; using an internet connected device wirelessly coupled to the WiFi protocol device, and using the internet connected device to configure or control a respective one of the cleaning units, wherein the first low data rate device is wirelessly coupled to the second low data rate device, wherein a data transfer rate of the first and second low data rate devices is substantially lower than a data transfer rate of the WiFi protocol device.

In yet another embodiment disclosed herein, a gateway unit for remotely communicating with one or more cleaning units comprises a Wi-Fi protocol device and a low data rate device coupled to the Wi-Fi protocol device, wherein the gateway unit is nearby each of the cleaning units, and wherein a data transfer rate of the low data rate device is substantially lower than a data transfer rate of the WiFi protocol device Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures:

FIGS. 5A-C show examples of reports available through the invention.

Figure 6C:
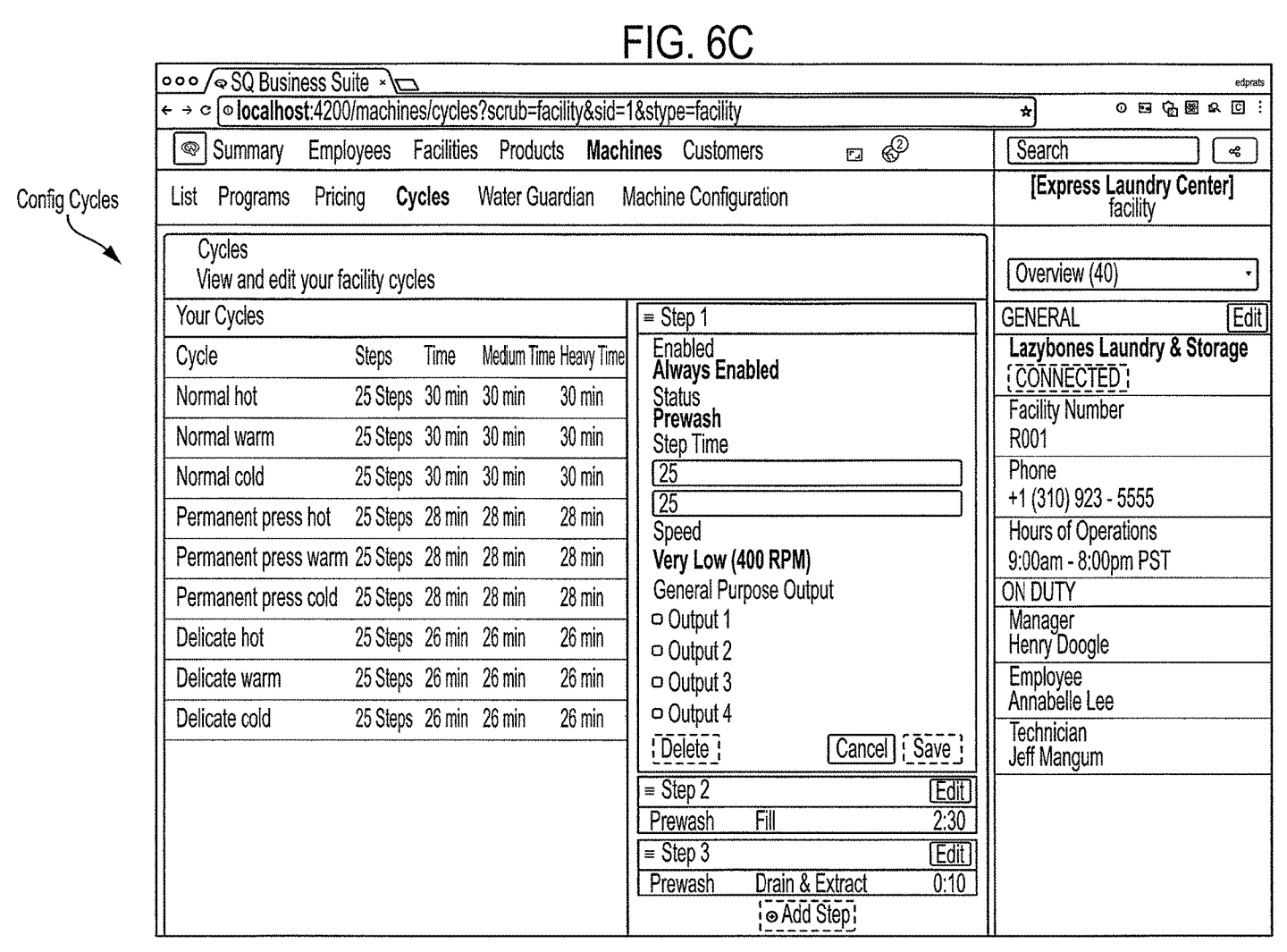

FIGS. 6A-6E show example screenshots of various configuration options for a store owner available through a cloud portal that uses the system for communication, according to an example aspect of the invention.

FIG. 8 is a diagram of a Raspberry Pi base according to an example aspect of the invention.

The invention will next be described in connection with certain exemplary embodiments; however, it should be clear to those skilled in the art that various modifications, additions, and subtractions can be made without departing from the spirit or scope of the claims.

DETAILED DESCRIPTION OF THE PREFERRED EMBODIMENTS

Figure 1:
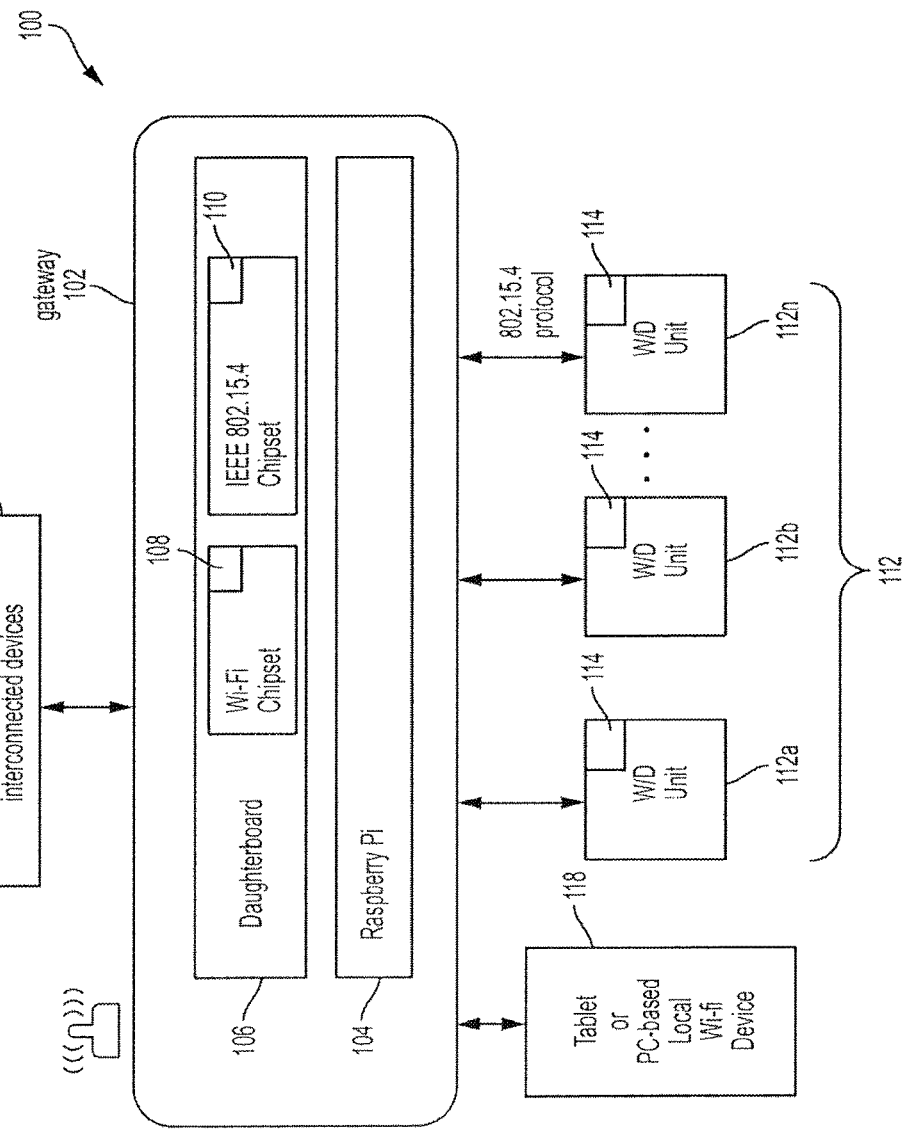
FIG. 1 is a diagram illustrating a system in accordance with an example aspect of the present invention.

FIG. 1 illustrates a system 100 in accordance with an example aspect of the present invention. FIG. 1 shows a gateway device 102 that operates as a laundry room "Gateway." As noted above the gateway 102 comprises a Raspberry Pi 104 and a daughterboard 106 including a Wi-Fi chipset 108 and a chipset 110 employing the IEEE 802.15.4 protocol.

The Raspberry Pi 104 in one embodiment may include (not shown) an OS on local eMMC (embedded Multi-Media Controller) storage, a CPU, a memory/RAM, storage, graphics, ports such as USB and HDMI, etc. An example of a suitable Raspberry Pi 104 that can be modified in accordance with an example embodiment of the invention is Avid Technologies part number: 90004024 Rev A.

The WiFi protocol chipset 108 may use any of the IEEE 802.11 protocols for implementing wireless local area network (WLAN) computer communication. The IEEE 802.11 protocols are created and maintained by the Institute of Electrical and Electronics Engineers (IEEE) LAN/MAN Standards Committee (IEEE 802). Any of the IEEE 802.11 protocol standards may be used for the WiFi protocol chipset 108. For example, the 802.11a protocol operates in the 5-6 GHz frequency band and has a data transfer rate of 1.5 Mbps ($1.5\times10^6$ bits per second) to 54 Mbps ($54\times10^6$ bits per second), the 802.11b protocol operates in the 2.4 GHz frequency band and has a maximum data transfer rate of 11 Mbps, the 802.11g protocol operates in the 2.4 GHz frequency band and has a maximum data transfer rate of 11 Mbps, the 802.11n protocol operates in the 5 GHz frequency band and has a maximum theoretical data transfer rate of 600 Mbps, and the 802.11ac protocol operates in the 5 GHz frequency band and has a maximum data transfer rate of 1.3 Gbps. An example of a suitable chipset employing the Wi-Fi protocol 108 is chipset LM TECHNOLOGIES, LM820-0462, WLAN, 802.3/U, 802.11B/G/N, 2.4 GHZ, USB.

The IEEE 802.15.4 is a technical standard which defines the operation of low-rate wireless personal area networks (LR-WPANs). It specifies the physical layer and media access control for LR-WPANs, and is maintained by the IEEE 802.15 working group. The IEEE standard 802.15.4 intends to offer the fundamental lower network layers of a type of wireless personal area network (WPAN) which focuses on low-cost, low-speed ubiquitous communication between devices. The IEEE standard 802.15 can be contrasted with the IEEE 802.11 Wi-Fi protocols, described above, which have substantially higher data transfer rates, and also require more power. The basic framework for the IEEE standard 802.15 is a 10-meter communications range with a data transfer rate of up to 250 kbps ($250\times10^3$ bits per second), which is substantially lower that the 802.11 Wi-Fi data transfer rates. The IEEE 802.15 working group is proposing IEEE 802.15 protocols with lower power and with lower transfer rates of 20 kbit/s, 40 kbit/s, and 100 kbit/s. Any of the protocols created by the IEEE 802.15 working group may be used for the chipset 110. An example of a suitable chipset employing the 802.15.4 protocol 110 is chipset Model: ProFlex01-R2 Part Number: 450-0075.

The Raspberry Pi 104 may use a local SD card for storage rather than eMMC storage, which is preferred because eMMC is a safer, longer lasting storage choice. Stock Raspberry Pi units use SD cards for storage which are volatile and frequently fail. The Raspberry Pi 104 includes onboard Wi-Fi, ethernet, and HDMI out.

The gateway 102 of the present invention also includes a memory and processor and further comprises the following components:

A Hat (Hardware Attached to Top) which contains the Wi-Fi chipset and the 802.15.4 chipset.

A local database on the Raspberry Pi which contains configuration information along with current audit/programming data.

A communication software module which decodes and encodes communication with the laundry equipment.

A cloud software module which module takes local data and sends data to the cloud. It also manages a constant connection to the cloud to monitor for new commands.

A maintenance website which is local on the gateway 102 and is used for setup and troubleshooting of the device.

Figure 3:
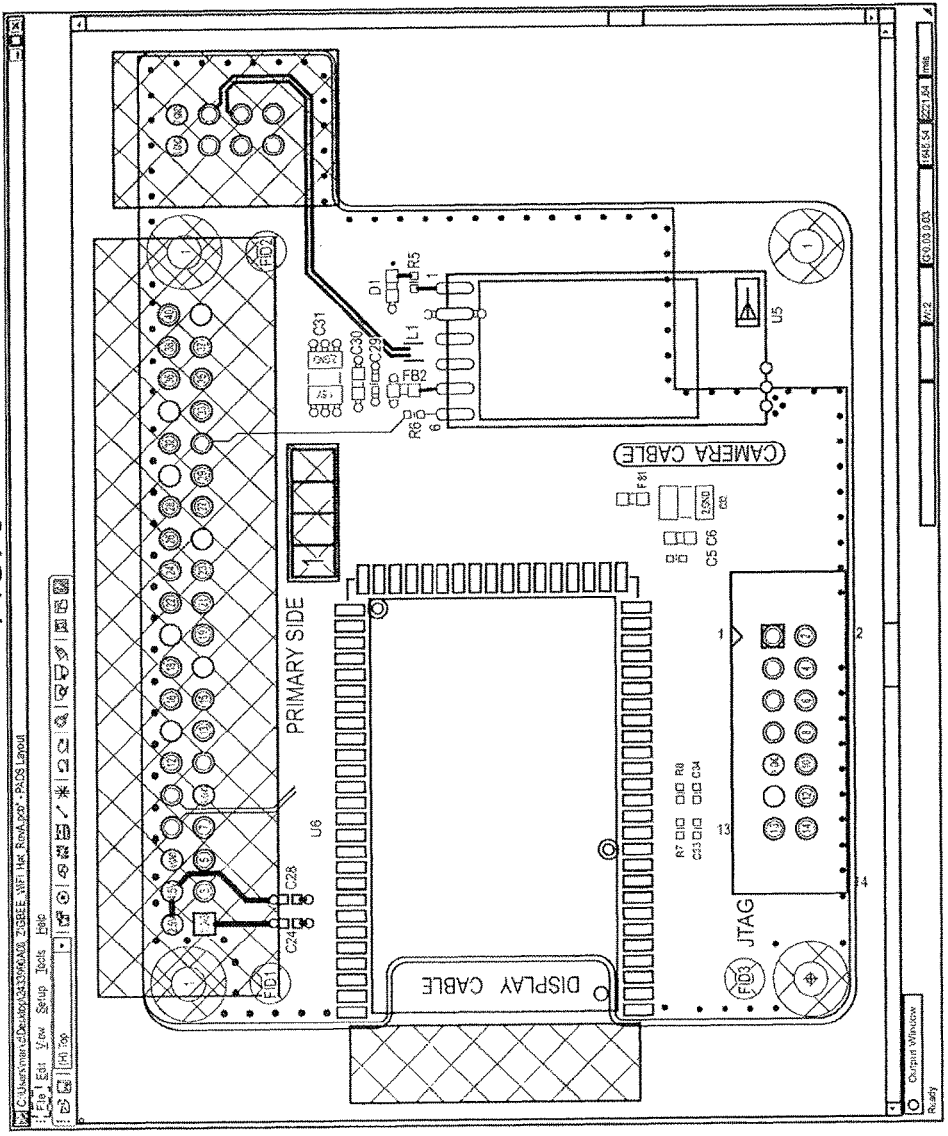
FIG. 3 is a schematic diagram of a daughterboard on a Raspberry Pi, in accordance with an example aspect of the present invention.
Figure 4:
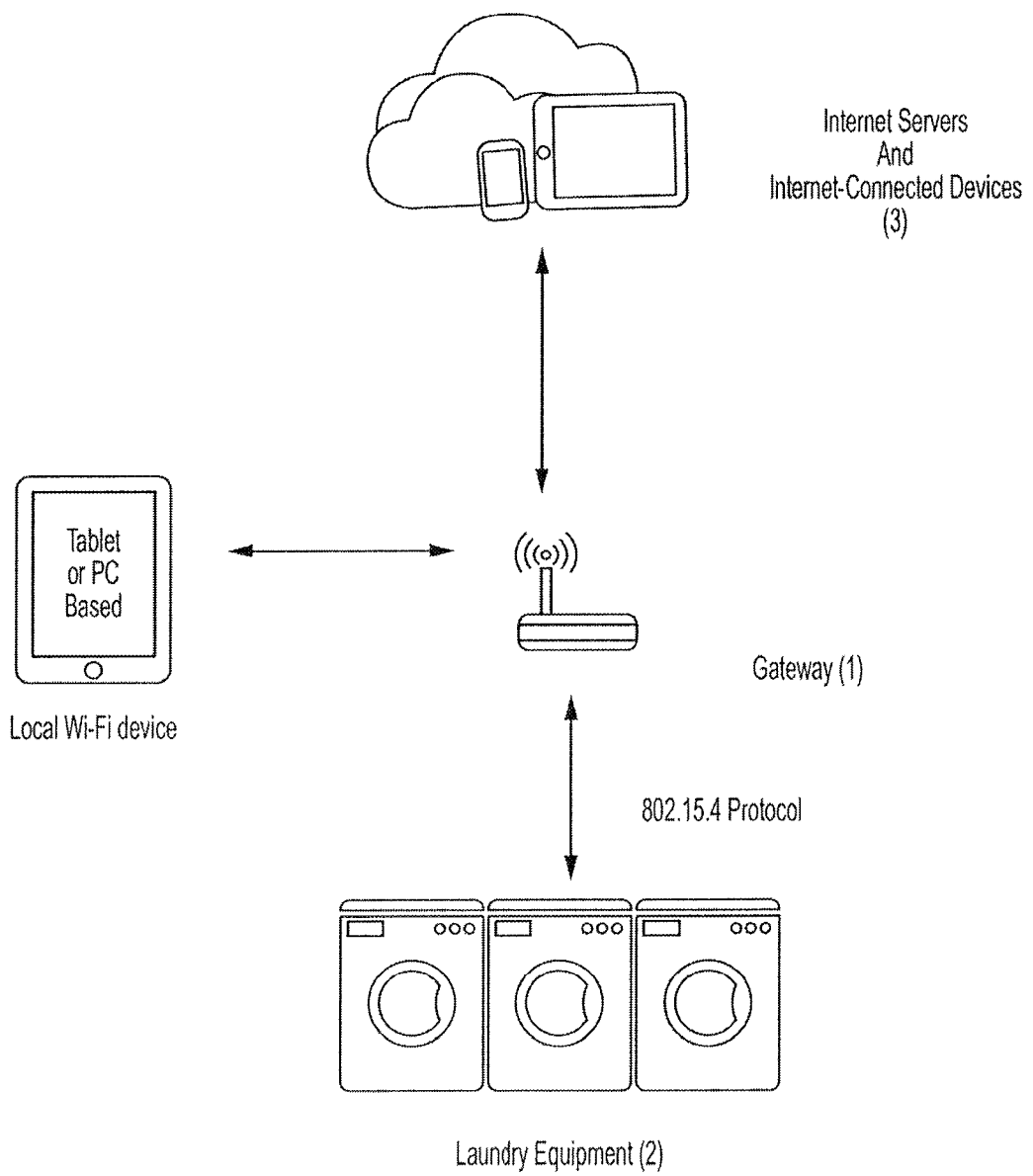
FIG. 4 is a diagram illustrating a system in accordance with an example aspect of the present invention.
Figure 6A:
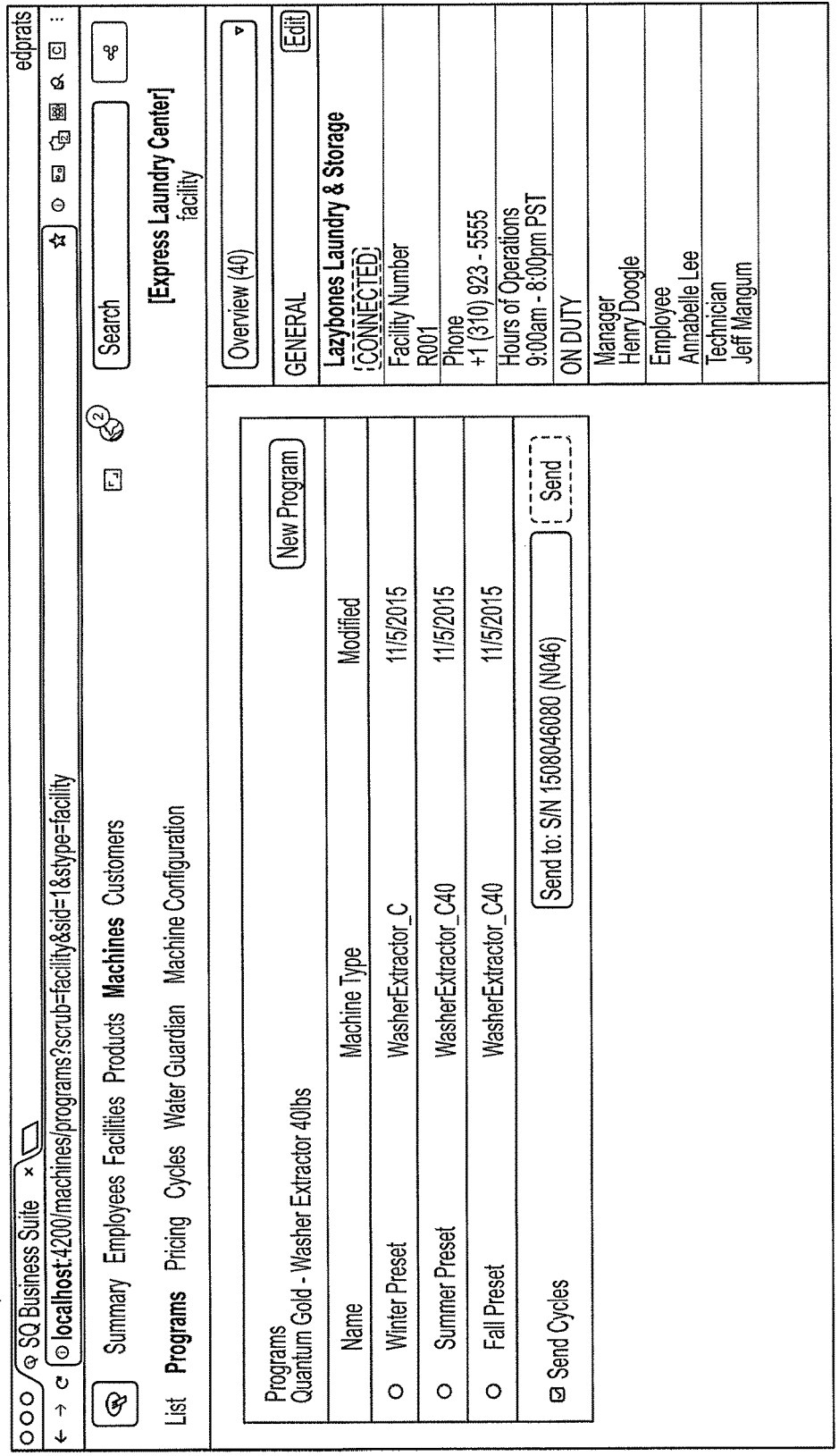
Figure 6D:
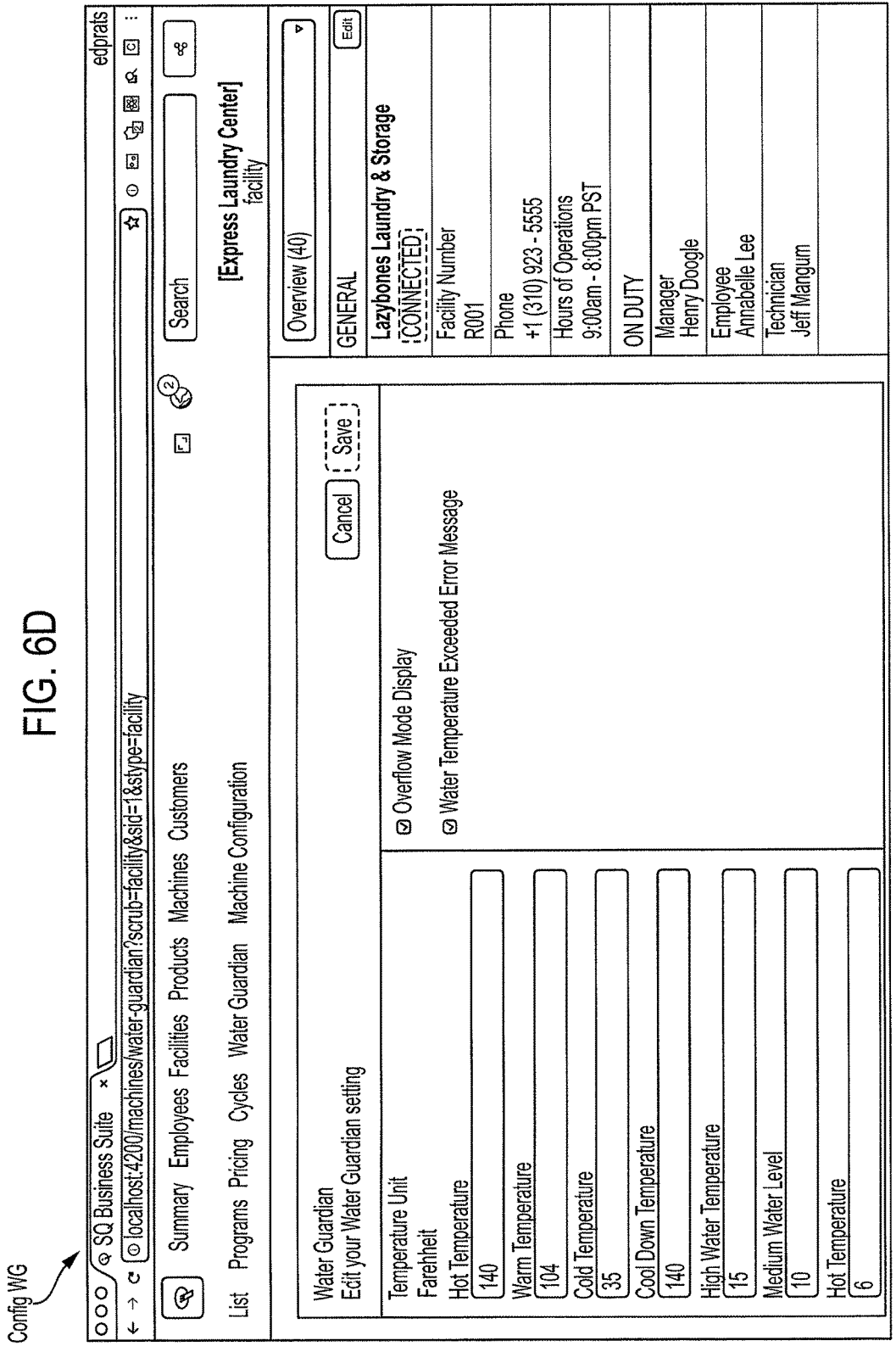

FIG. 3 is a schematic diagram of a daughterboard on a Raspberry Pi, in accordance with an example aspect of the present invention. The diagram of the gateway provided is of the Hat. It contains the 802.15.4 chipset and the additional Wi-Fi chipset. The rest of the gateway is the modified Raspberry Pi with the eMMC storage. FIG. 8 is a diagram of the Raspberry Pi base according to an example aspect of the present invention, and shows eMMC storage 200. This diagram displays the baseboard of the gateway. While FIG. 3 is a diagram of the hat—the daughterboard which has the second Wi-Fi chipset and the 802.15.4 chipset—FIG. 8 shows the base, which is a modified Raspberry Pi, implemented with a Broadcom BCM2837 processor 202. A key feature of this board is that it's been modified to use eMMC storage 200 instead of the standard SD storage.

The gateway 102 wirelessly and directly connects to the computer system 114 of each cleaning unit or laundry equipment 112a, 112b, . . . , 112n using the IEEE 802.15.4 protocol. The gateway 102 is preferably located within 10 meters of each of the cleaning units 112a, 112b, . . . , 112n if the IEEE 802.15.3 protocol is used; however, other protocols that have a greater range may be used that allow the gateway 102 to be located further away from the cleaning units than 10 meters. Typically the gateway 102 is located nearby the cleaning units 102, or within a distance of 30 meters of the cleaning units 112. The gateway 102 provides internet-based machine reporting and machine configuration while also enabling users to pay for vended laundry from a mobile device or phone.

Figure 7:
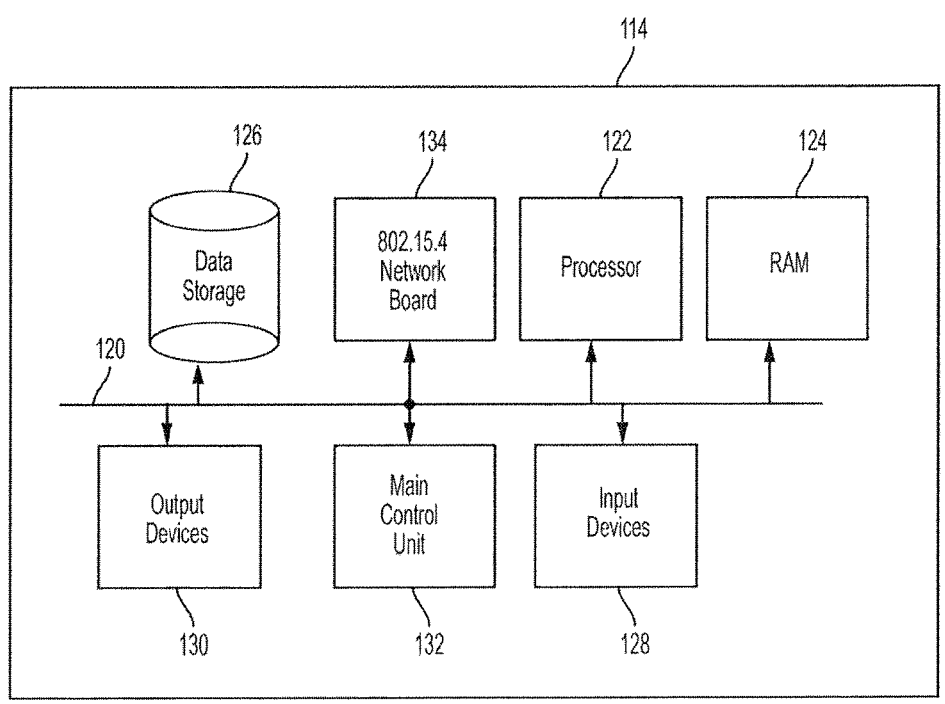
FIG. 7 shows a computer system of each washer/dryer unit according to an example aspect of the invention.

More specifically, FIG. 7 shows the computer system 114 of each cleaning unit or washer/dryer unit 112. The computer system 114 of each washer/dryer unit 112 comprises a processor 122, a memory 124, data storage or databases 126, and input and output devices 128, 130. In one embodiment, the computer system 114 includes programmed instructions and algorithms (software, modules, and subroutines) for carrying out the methods described herein. The computer system 114 has a bus system 120 including, for example, a data bus and a motherboard, which can be used to establish and control data communications between the components. The data storage unit 126 may be a non-volatile memory, such as a hard drive, or other computer readable media known in the art. The computer system 114 includes input devices 128 known in the art, including, e.g., a keypad or keyboard or other peripherals. Example output devices 130 include a display device, an audio device, etc.

The computer system 114 also comprises a main control unit 132 which connects to an 802.15.4 network daughterboard 134 also located in the computer system 114. The gateway 102 requests information from the main control unit 132 through the network daughterboard 134. The main control unit 134 contains audit history and programs which are reported to the gateway 102. The gateway 102 can request all data or only data changed since the last request. Programs include the types of cycles that the machine can run and the details of those cycles. Audit history includes the information regarding cycles run in the machine's lifetime and error/maintenance history.

The system 100 also includes internet services and interconnected devices 116 which the gateway 102 communicates with, and a mobile or PC-based local Wi-Fi device 118, which can act as a user or administrator device in order to control or remotely communicate with the washer/dryer units 112 through the gateway 102. Accordingly, the gateway 102 enables washer/dryer units 112 to communicate wirelessly with servers 116 on the internet, thereby enabling users or administrators to communicate with and remotely control the washer/dryer units 112 through the mobile or PC-based local Wi-Fi device 118. The laundry equipment 112 may be for example a washer unit and/or a dryer unit, whether these units are standalone or combined. Other appliances are contemplated as well, such as dishwasher units.

"Reporting" includes features such as whether a wash/dry cycle is done or when it will be done; the status of the washer/dryer unit 112 (i.e., whether the machine or unit 112 is available or already in use); the types of wash/dry cycles available, etc. "Reporting" may also include, for an administrator, the overall performance of the unit 112, how many hours of usage it has, whether it is in need of repair or an error/service indicator is on; etc.

FIGS. 5A-C show examples of reports available through the invention, labeled in the figures as General Reports, Network Reports, Processed Reports, Audit Reports, Lifetime Reports, Pricing Reports, Water Usage Reports, and Snapshot Reports. Real-time alerts include error status, machine availability, time remaining, current cycle info, etc. The list in FIGS. 5A-C is not meant to be limiting or exhaustive of all such examples or features.

In more detail, as shown in FIGS. 5A-C, General Reports include reports related to machine listing, security, location, presets, and maintenance, as well as task, contact, employee, wash/dry/fold, network controller, machine type, service type, product type, and action reason. Network reports contain reports related to the cycle, operation, break-in, error, and power fail history of the item highlighted. Processed Reports include reports listing the cycle, vend, audit, security, and diagnostic information processed on the item highlighted. Audit Reports include reports detailing the operation, productivity, vending, and security of the item highlighted. Lifetime Reports include reports summarizing the operation and error diagnostics over the lifetime of the item highlighted. Pricing Reports include the pricing information for every cycle on every machine. Water Usage Reports include the approximate amount of water each machine uses per cycle. Snapshot Reports include snapshot reports on selected machines such as store and revenue, attendant audit, and coin vault.

"Configuration" includes features such as a user being able to configure or program a wash/dry cycle; a user being enabled to pay for use of a washer/dryer unit 112; an administrator being able to program a machine; etc. FIGS. 6A-6E show example screenshots of various configuration options for a store owner (user type 1) available through a cloud portal that uses the system for communication. The list is extensive. A customer in the store (user type 2) would be covered by the Example Implementation set forth below.

Figure 2:
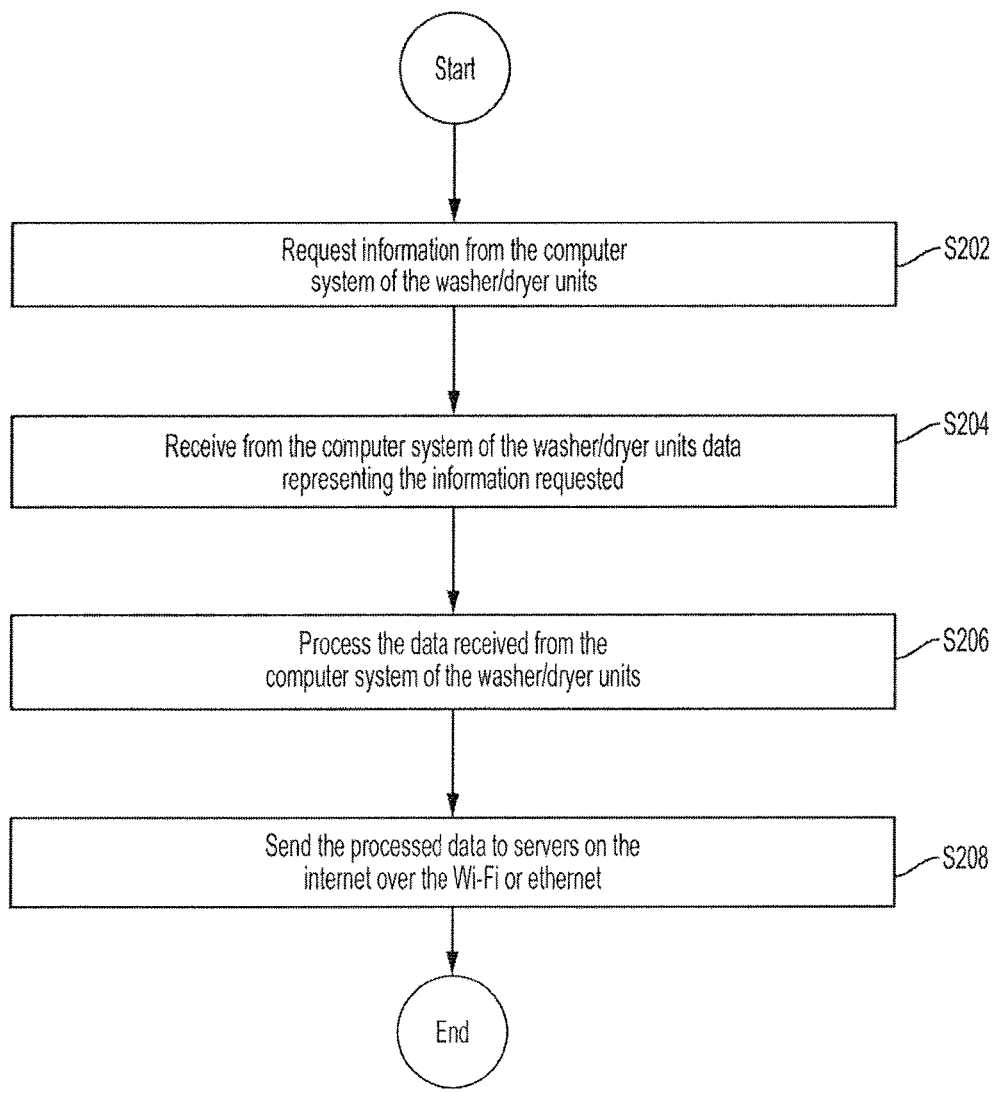
FIG. 2 is a flowchart illustrating a method in accordance with an example aspect of the present invention.

FIG. 2 is a flowchart illustrating a method 200 in accordance with an example aspect of the present invention. The method 200 can be implemented for example in a software program or code embodied in a computer-readable storage medium in the gateway 102 directed to the processing carried out by the gateway 102.

In step S202, the gateway 102 requests information from the computer system 114 of washer/dryer units 112 connected using the 802.15.4 protocol, for example in response to a prompt or request by a user or administrator. More specifically, as noted above the computer system 114 of each washer/dryer unit 112 has a main control unit 132 which connects to an 802.15.4 network daughterboard 134 also located in the computer system 114 as shown in FIG. 7. The gateway 102 requests information from the main control unit 132 through the network daughterboard. The main control unit 132 contains audit history and programs which are reported to the gateway 102. The gateway 102 can request all data or only changed data since the last request. Programs include the types of cycles that the machine can run and the details of those cycles. Audit history includes the information regarding cycles run in the machine's lifetime and error/maintenance history.

In step S204 the gateway 102 receives from the computer system 114 of the washer/dryer units 112 data representing the information requested.

In step S206 the gateway 102 processes the data received from the computer system 114 of the washer/dryer units 112 into digestible form. More specifically, the data is in a byte array which is then decoded into human readable form. This is done using a module that uses byte stream information to determine the type and size of a machine and then decodes the rest of the byte array into human readable form.

In step S208 the gateway 102 sends the processed data or information to servers on the internet 116 over, e.g., Wi-Fi or Ethernet. This information can then be used for reporting.

The gateway 102 facilitates user machine requests. These requests may take the form of: machine configuration, remote payments, or remote commands. This allows the washer/dryer units 112 to be controlled from a remote location, thereby enabling users to pay for laundry from an internet-connected device 118, or location owners/administrators to send configuration or commands to a unit or machine 112 via an internet-connected device 118.

As to location owners/administrators being enabled to send configuration or commands to a unit or machine 112 via an internet-connected device 118, this can be done via the management portal that is reflected in the configuration screens of FIGS. 6A-E. In a preferred embodiment the device would be a personal computer, laptop or tablet web browser or the like rather than a mobile app, but a device with a mobile app is contemplated also.

Accordingly, as discussed above, the gateway 102 of the present invention contains a Raspberry Pi device 104 with added pieces of hardware and software added to achieve its goals. As also discussed above there is a daughterboard 106 added to the device 102 which contains an 802.15.4 chipset 110 which allows the gateway 102 to communicate with a computer system 114 of the laundry equipment 112. The daughterboard 106 also has a Wi-Fi chipset 108 which allows the gateway 102 to broadcast a Wi-Fi network for user setup. There are pieces of software to allow for a user to set up the device and to facilitate the collection, temporary storage, and transmission of data. More specifically, the communication software module, the cloud software module, and the maintenance website described above in connection with an example embodiment describe the functionality that facilitates collection, storage, and transmission. The software that allows for the setup is an embedded web server on the device itself—similar in appearance and functionality to the setup routine used to configure a consumer wireless router in the home. Accordingly the functions and capabilities available to the user or administrator as described herein can be provided to the user or administrator in the form of a mobile app or "app" available for download to the mobile or PC-based local Wi-Fi device 118.

Example Implementation

The following is a description of an example implementation according to one example aspect of the invention, although it is of course to be understood that this is just an example and the invention is not limited thereto.

According to this example aspect of the invention, a user would use a mobile device such as a smartphone to download an app to use the invention. For example an end user (User Type 2) would download an iOS or Android app.

The user would have two initial configuration tasks: (1) the creation of a user account, and (2) the entering of the location (Laundromat, apartment complex, college dorm) that the user is in. At that point the app can be used for two purposes:

Pay for a washing or drying cycle
  The application uses an online wallet that is funded for example with a saved credit/debit card or a QR code served from a value transfer machine (i.e., one that takes bills and displays a QR code with the value that is then scanned into the app).
  The user selects the desired machine (e.g., by scanning a QR code or entering in a displayed machine code).
  The user selects options on the machine and then refreshes the app which shows the current price.
  The user indicates that she wants to pay and the funds are deducted from the online wallet while the start button on the machine is lit and can then be pressed.
  The pi gateway communicated with the machine and the SaaS infrastructure of the invention—the mobile app communicates just with the SaaS backend. Thus it looks like the user is "talking" directly with the machine but the communication is actually asynchronous (pi to machine and SaaS, user to SaaS).

Look at the availability of washers and/or dryers at the location.
  The gateway regular polls the machines in a given location for their status and updates that data on the SaaS backend—the user app reflects that status for each machine in a location using a color coding system along with details for time remaining (for machines in use).

In the foregoing description, the invention is described with reference to specific example embodiment(s) thereof. The specification and drawings are accordingly to be regarded in an illustrative rather than in a restrictive sense. It will, however, be evident that various modifications and changes may be made thereto, e.g., in a computer program product or software, hardware, or any combination thereof, without departing from the broader spirit and scope of the present invention.

The present invention or any part(s) or function(s) thereof, including, e.g., the gateway 102, the Raspberry Pi 104, the daughterboard 106, the wi-fi chipset 108, the chipset employing the IEEE 802.15.4 protocol 110, or others, the computer system 114 of a washer/dryer unit 112 may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a crossover bar, or a network). Various software embodiments are described in terms of such an exemplary computer system. After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein. It is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

What is claimed is:

1. A system for remotely communicating with one or more cleaning units, the system comprising:
   one or more cleaning units, each cleaning unit comprising:
      a control unit coupled to the cleaning unit for operating the cleaning unit; and
      a first low data rate device coupled to the control unit;
   a gateway unit comprising:
      a Wi-Fi protocol device; and
      a second low data rate device coupled to the Wi-Fi protocol device;
      wherein the gateway unit is nearby each of the cleaning units; and
   an internet connected device wirelessly coupled to the Wi-Fi protocol device;
   wherein the first low data rate device is wirelessly coupled to the second low data rate device;
   wherein a data transfer rate of the first and second low data rate devices is substantially lower than a data transfer rate of the Wi-Fi protocol device; and
   wherein the gateway unit enables the internet connected device to communicate wirelessly with each of the cleaning units thereby enabling the internet connected device to wirelessly configure or control each of the cleaning units by submitting a payment for a respective cleaning unit for a cleaning cycle and wirelessly receiving a report from each of the cleaning units.

2. The system of claim 1:
   wherein the first low data rate device and the second low data rate device each comprise an IEEE 802.15 protocol device or an IEEE 802.15.4 protocol device; and
   wherein the Wi-Fi protocol device comprises an IEEE 802.11 protocol device.

3. The system of claim 1 wherein the cleaning unit is a laundry washer, a laundry dryer, or a dishwasher.

4. The system of claim 1 wherein a distance between the gateway unit and each of the cleaning units is less than or equal to 10 meters.

5. The system of claim 1:
   wherein the first low data rate device and the second low data rate device each have a data transfer rate of less than or equal to 250 kbps; and
   wherein the Wi-Fi protocol device has a data transfer rate of greater than or equal to 1.5 Mbps.

6. The system of claim 1 wherein the internet connected device comprises a personal computer, a laptop, a notebook, a tablet, or a mobile phone.

7. The system of claim 1 wherein the gateway unit further comprises:
   a Raspberry Pi comprising:
      an embedded Multi-Media Controller (eMMC) storage;
      a CPU coupled to the eMMC; and
      a memory coupled to the CPU.

8. The system of claim 1 wherein the control unit comprises:
   a processor;
   a memory coupled to the processor; and
   a non-volatile data storage unit coupled to the memory.

9. The system of claim 1 wherein configuring a unit comprises programming a wash cycle or a dry cycle.

10. The system of claim 9 wherein the report from each of the cleaning units includes:
    one or more available types of the wash cycle or the dry cycle; and
    a progress or completion of the wash cycle or the dry cycle.

11. A method for remotely communicating with one or more cleaning units, the method comprising:
    using one or more cleaning units, each cleaning unit comprising:
       a control unit coupled to the cleaning unit for operating the cleaning unit; and a first low data rate device coupled to the control unit;
    providing a gateway unit comprising:
       a Wi-Fi protocol device; and
       a second low data rate device coupled to the Wi-Fi protocol device; wherein the gateway unit is nearby each of the cleaning units;
    using an internet connected device wirelessly coupled to the Wi-Fi protocol device; and
    using the internet connected device to configure or control a respective one of the cleaning units;
    wherein the first low data rate device is wirelessly coupled to the second low data rate device;
    wherein a data transfer rate of the first and second low data rate devices is substantially lower than a data transfer rate of the Wi-Fi protocol device; and
    wherein configuring or controlling a cleaning unit comprises programming a wash cycle or a dry cycle, submitting a payment for a respective cleaning unit for the wash cycle or the dry cycle, and wirelessly receiving a report from each of the cleaning units.

12. The method of claim 11:
    wherein the first low data rate device and the second low data rate device each comprise an IEEE 802.15 protocol device or an IEEE 802.15.4 protocol device; and
    wherein the Wi-Fi protocol device comprises an IEEE 802.11 protocol device.

13. The method of claim 11:
    wherein the first low data rate device and the second low data rate device each have a data transfer rate of less than or equal to 250 kbps; and
    wherein the Wi-Fi protocol device has a data transfer rate of greater than or equal to 1.5 Mbps.

14. The method of claim 11 wherein the gateway unit further comprises: a Raspberry Pi comprising:

an embedded Multi-Media Controller (eMMC) storage; a CPU coupled to the eMMC; and
a memory coupled to the CPU.

15. The method of claim 11 wherein the report from each of the cleaning units includes:
one or more available types of the wash cycle or the dry cycle; and
a progress or completion of the wash cycle or the dry cycle.

16. A gateway unit for remotely communicating with one or more cleaning units comprises:
a Wi-Fi protocol device, the Wi-Fi protocol device configured to wirelessly couple the gateway unit to an internet connected device; and
a low data rate device coupled to the Wi-Fi protocol device, the low data rate device configured to wirelessly couple the gateway unit to the cleaning units;
wherein the gateway unit is nearby each of the cleaning units; and
wherein a data transfer rate of the low data rate device is substantially lower than a data transfer rate of the Wi-Fi protocol device; and
wherein the Wi-Fi protocol device and the low data rate device enable the internet connected device to communicate wirelessly with each of the cleaning units thereby enabling the internet connected device to wirelessly configure or control each of the cleaning units by submitting a payment for a respective cleaning unit for a cleaning cycle and wirelessly receiving a report from each of the cleaning units.

17. The gateway unit of claim 16:
wherein the low data rate device comprises an IEEE 802.15 protocol device or an IEEE 802.15.4 protocol device; and
wherein the Wi-Fi protocol device comprises an IEEE 802.11 protocol device.

18. The gateway unit of claim 16 wherein a distance between the gateway unit and each of the cleaning units is less than or equal to 10 meters.

19. The gateway unit of claim 16: wherein the low data rate device has a data transfer rate of less than or equal to 250 kbps; and
wherein the Wi-Fi protocol device has a data transfer rate of greater than or equal to 1.5 Mbps.

20. The gateway unit of claim 16 further comprising:
a Raspberry Pi comprising:
an embedded Multi-Media Controller (eMMC) storage;
a CPU coupled to the eMMC; and
a memory coupled to the CPU.

* * * * *